United States Patent

[11] 3,622,794

[72] Inventors Charles Ray Pond
 Federal Way;
 Patrick D. Texeira, Renton, both of Wash.
[21] Appl. No. 835,608
[22] Filed June 23, 1969
[45] Patented Nov. 23, 1971
[73] Assignee The Boeing Company
 Seattle, Wash.

[54] IMPROVEMENTS IN FEEDBACK APPARATUS FOR STABILIZING HOLOGRAMS
5 Claims, 6 Drawing Figs.

[52] U.S. Cl. .................................................. 250/201,
 250/218, 250/225, 350/3.5, 356/106
[51] Int. Cl. .................................................. G01j 1/20,
 G01n 21/26, G02b
[50] Field of Search .................................................. 250/201,
 218, 225; 350/3.5; 356/106

[56] References Cited
UNITED STATES PATENTS
3,494,698 2/1970 Neumann ........................ 350/3.5 X
OTHER REFERENCES
Neumann et al., " Improvement of Recorded Holographic Fringes by Feedback Control," June 1967, Applied Optics, pp. 1097–1104, Vol. 6, No. 6

Primary Examiner—Archie R. Borchelt
Assistant Examiner—T. N. Grigsby
Attorneys—Glenn Orlob, Bernard Donahue and Kenneth W. Thomas ABSTRACT: Method and apparatus for stabilizing the wave fronts at the recording plane of a hologram during hologram manufacture or while viewing a stored-beam interferogram. The disclosed system alleviates vibration isolation restrictions normally encountered with holographic work. A negative feedback system is utilized to monitor the change in intensity of a reconstructed optical wave front of light transmitted through or reflected from the hologram, relate such change to a known change in phase, and to phase modulate either the reference or signal beam accordingly. The intensity is monitored in either the signal beam or reference beam portion of the transmitted or reflected light. The wave fronts are controlled by adjusting the phase of either beam in accordance with a control signal. The negative feedback system includes a photodetector, a band-pass amplifier, a phase detector, a signal generator, a summing amplifier, a high voltage amplifier and an electro-optic phase modulator. Special purpose embodiments suitable for sampling local density fluctuation in a flowing gas are disclosed. Optional embodiments employing AC or DC stabilization circuits are presented.

PATENTED NOV 23 1971
3,622,794
SHEET 1 OF 2

INVENTORS
CHARLES R. POND
PATRICK D. TEXEIRA
BY
*B.U. Donahue*
ATTORNEY

INVENTORS
CHARLES R. POND
PATRICK D. TEXEIRA

BY

ATTORNEY

IMPROVEMENTS IN FEEDBACK APPARATUS FOR STABILIZING HOLOGRAMS

This invention relates to the electrooptical art of hologram and interferogram manufacture and use, and more particularly involves an improved technique for wave front stabilization.

The holograph technique for measuring the difference in wave fronts emanating from an object at two different times is well-known and is called holographic interferometry. In the past it has been necessary to practice the technique under controlled laboratory conditions wherein phase perturbation of the signal and reference beams are not likely to occur and where the relative position of the test specimen and the recording media can be established and held to extremely close tolerances.

Brief consideration of the air-supported, glass-covered, heavy granite slabs situated in quiet, air-conditioned laboratories ordinarily used by researchers in holography indicates the potential difficulty in adapting established holographic methods to nonlaboratory uses, such as nondestructive testing in a factory environment. These conventional environmental control methods are strickly brute force techniques for stabilizing wave fronts at the hologram recording plane. A more sophisticated approach is to compensate for environmentally induced phase errors by controlling the relative phase of interfering beams. One such approach has been suggested in the literature by Neumann and Rose; see "Improvement of Recorded Holographic Fringes by Feedback Control," *Applied Optics*, 6, June 1967, p. 1097. This approach uses a photomultiplier behind the recording medium to detect motions of the hologram fringes. The closed-loop system does not include all of the optical elements, thus, it is possible to have instabilities at the recording medium even though the hologram fringes are stabilized at the photomultiplier. Furthermore, in the referenced technique, only a small fraction of the available energy can be sampled, thereby creating problems in accuracy and cost and complexity of electronic and optical components.

Holography is a method for recording the amplitude and phase of the optical wave front from an object in such a manner that these wave fronts can be reconstructed wherein the amplitude and phase relation of the original wave front are preserved. In ordinary photography all the optical phase information is lost. The reconstructed holographic wave fronts, on the other hand, are indistinguishable from the original wave front. This accounts for the much publicized, three-dimensional properties of the holographic reconstruction.

The general holographic method, invented by Gabor (D. Gabor, *Proceedings Royal Society*, London, A197, 454, 1947; *Proceedings Physical Society*, London, B64, 449, 1951) and improved by Leith and Upatnieks (F. Leith and J. Upatnieks, *Journal Optical Society of America*, 54, pg. 1,295, 1964) and Horman (M. H. Horman, *Applied Optics*, 4, pg. 333, 1965), is based on recording the interference pattern formed by simultaneously illuminating the recording media with the wave fronts from the object (signal beam) and a temporarily coherent reference beam. The recorded interference pattern is called a hologram, and it has the property of reconstructing the signal beam wave front when illuminated only by the reference beam.

The following mathematical analysis describes the holographic process and clarifies the extension to the state of the art made possible by our invention.

The signal beam and reference beam at the holographic recording plane can be represented in the usual complex notations as follows:

signal beam $s(x,y) = a_s e^{j(wt+\phi_s)}$ reference beam $r(x,y) = a_r e^{j(wt+\phi_r)}$ where $a_s$ and $a_r$ are the amplitudes of the signal and reference beams at the point $(x,y)$ and $\Phi_s$ and $\Phi_r$ are their phases. The optical radian frequency is $w$, and $t$ is time.

The recording medium responds to the incident intensity, $I$, where $$I = |s+r|^2 = a_s^2 + a_r^2 + 2a_s a_r \cos(\Phi_s - \Phi_r)$$

In an ideal holographic recording medium, the amplitude transmittance after developing is a linear function of the incident intensity during exposure, as expressed by the relation:

$$T_a = T_0 + kI$$

where $T_a$ is the amplitude transmittance after developing, and $T_0$ and $k$ are constants which depend on the particular recording medium employed.

When the developed hologram is illuminated by just the reference beam, the waves transmitted through the hologram are given by $$rT_a = rT_0 + rkI$$

The first term, $rT_0$, is simply the reference beam attenuated by the hologram. The second term can be expanded as follows:

$$rkI = rk(a_s^2 + a_r^2) + 2ka_r^2 a_s e^{j(wt+\phi_r)} \cos(\phi_s - \phi_r)$$

$$= rk(a_s^2 + a_r^2) + 2ka_r^2 a_s e^{j(wt+\phi_r)} \left[\frac{e^{j(\phi_s-\phi_r)} + e^{j(\phi_r-\phi_s)}}{2}\right]$$

where the $\cos(\Phi_s - \Phi_r)$ term has been expressed in exponential form. After clearing fractions and multiplying out the final term, $$rkI = rk(a_s^2 + a_r^2) + ka_r^2 a_s e^{j(wt+\phi_s)} + ka_r^2 a_s e^{j(wt+2\phi_r - \phi_s)}$$

The middle term is just the original signal beam weighted by the factor $ka_r^2$, thus the hologram reconstructs the signal beam when illuminated only by the reference beam.

The preceding discussion is the usual analysis of the holographic process. The following analysis pertains to our invention.

Suppose the phase of the reference beam is modulated by a time varying function, $\Phi(t)$, then the expression of the reference beam is $$r(x,y,t) = a_r e^{j(wt + \phi_r + \phi(t))}$$

The phase modulation can be accomplished in several ways, for instance with an electro-optic modulator, an acoustic modulator, or a mechanically driven mirror.

The reconstructed signal beam is again $$rT_a = rT_0 + rkI,$$

but now, $$rkI = rk(a_s^2 + a_r^2) + ka_r^2 a_s e^{j(wt+\phi_s - \phi(t))} + ka_r^2 a_s e^{j(wt+2\phi_r - \phi_s + \phi(t))}$$

Inspection of the second term reveals that the phase of the reconstructed signal beam is modulated with the same time varying function, $\Phi(t)$, that describes the phase modulation of the reference beam. It is important to notice that the phase modulation of the reconstructed signal beam is independent of the position $(x,y)$ on the hologram. The phase changes by the same amount over the entire hologram.

When the hologram is recorded on a self-developing medium, such as ordinary photographic film which has been immersed in developing solution before exposure, or a photochromic material, the amplitude transmission function changes during exposure to the reference and signal beams. Thus, even while recording the hologram, the reference beam is reconstructing the signal beam. If the phase of the reference beam is modulated, this plan modulation appears on the reconstructed signal beam, but not on the direct signal beam. In a practical hologram recording experiment, there are other phase perturbations of both the signal beam and reference beam due to atmospheric effects, slight relative motion of the components, and frequency changes of the laser radiation.

The net intensity in the transmitted signal beam (direct waves plus reconstructed waves) is sensitive to all of the phase perturbations. The mathematical form of this combined signal beam follows from the preceding derivations. $I_s = A + B \cos(\Phi(t) + \Delta\Phi_s + \Delta\Phi_r)$, $A \geq B > 0$ where $A$ and $B$ are constants and $\Delta\Phi_s$ and $\Delta\Phi_r$ are phase perturbations of the signal and reference beams.

Now if $\Phi(t)$ is made equal in magnitude and opposite in sign to $(\Delta\Phi_s + \Delta\Phi_r)$, $I_s$ is maximum, and the reconstructed waves are, therefore, in phase with the direct signal waves. In the case of a photochromic material used in the photobleaching mode, this is the condition required to correct for the phase perturbations and stabilize the wavefronts at the recording plane. If the recording material is used in the photodarkening mode, the reconstructed waves should be 180° out of phase with the direct signal waves, so the stability condition is $$\Phi(t)+\Delta\Phi_s+\Delta\Phi_r=(2n-1)\pi$$

where $n$ is an integer. $I_s$ is then a minimum.

Although it has been assumed for purposes of discussion that $\Phi(t)$ is a phase modulation of the reference beam, it should be noticed that the expression for $I_s$ and the stability conditions are unchanged if $\Phi(t)$ is a phase modulation of the signal beam. The phase modulator can be placed in either beam. It should also be noticed that the preceding discussion is applicable to stabilization of the wavefront while viewing a stored-beam holographic interferogram.

One other relationship is important for understanding the operation of this invention. The expression for $I_s$ can be differentiated to yield $$dI_s/d\Phi(t)=-B\sin(\Phi(t)+\Delta\Phi_s+\Delta\Phi_r)$$

Consider, for example, a photobleached hologram where the stability condition $$\Phi(t)+\Delta\Phi_s+\Delta\Phi_r=0$$

The derivative above shows that $I_s$ increases when $\Phi(t)$ is increased while $\Phi(t)+\Delta\Phi_s+\Delta\Phi_r$ is negative, and $I_s$ decreases when $\Phi(t)$ is increased while $\Phi(t)+\Delta\Phi_s+\Delta\Phi_r$ is positive, $-\pi/2 < (\Phi(ta)+\Delta\Phi_s+\Delta\Phi_r) < \pi/2$.

The amount of change of $I_s$ for a given change of $\Phi(t)$ depends on the instantaneous magnitude of $\Phi(t)+\Delta\Phi_s+\Delta\Phi_r$. Thus, both the magnitude and direction of the total phase perturbation of both beams can be determined by measuring only the change in $I_s$ due to a known change in the phase of either the reference or signal beam. Furthermore, as was shown earlier, the total phase perturbation can be eliminated by adjusting the phase of either beam.

It is the object of this invention to provide a method and apparatus for controlling and stabilizing the wavefronts at the plane of a hologram during recording or while viewing a stored-beam holographic interferogram, thereby removing the restriction on vibration isolation normally encountered with holographic work and allowing the use of holographic methods in previously inaccessible environments.

The above objective is achieved by monitoring the change in intensity of the light transmitted through or reflected from the hologram, and relating said change in intensity to a known change in phase of either the signal beam or the reference beam. The intensity can be monitored in either the signal beam or reference beam portions of the transmitted or reflected light. The wavefronts are controlled by adjusting the phase of either beam in accordance with a control signal derived by monitoring changes in light intensity.

The differences between our invention and the technique used in the Neumann and Rose publication referenced previously, will be apparent to those skilled in the art. In the referenced publication, the photodetector senses the interference pattern between the signal beam and the reference beam. In fact, a slit is used to limit the pattern to a single fringe. In out invention, the error signal is derived from interference between a direct beam (either a signal beam or reference beam) and a reconstructed beam. In systems in which the closed loop does not include all of the optical elements it is possible to have instability at the recording medium even though the hologram fringes are stabilized at the photomultiplier. This problem does not exist in our invention. Furthermore, as was noted previously, in the referenced technique only a small fraction of the available energy is sampled. All of the energy available can be used with our invention, resulting in increased accuracy and simplification of the electrical and optical components. Additional differences in our invention and the apparatus discussed in the referenced publication will become apparent in the discussion which follows.

DESCRIPTION OF THE PREFERRED EMBODIMENTS

Figure 1:
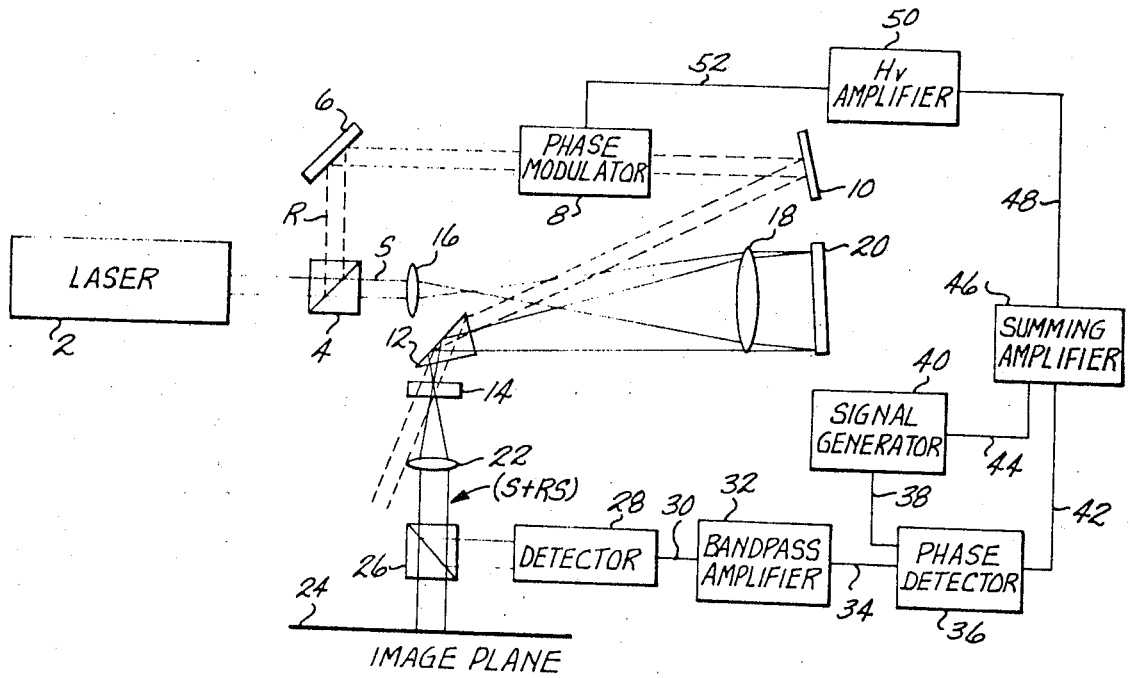
FIG. 1 schematically depicts a preferred embodiment of a hologram stabilization apparatus utilizing a negative feedback control system constructed according to the teachings of this disclosure.

FIG. 1 is a schematic of a preferred embodiment of the stabilization system wherein light from the laser 2 is divided into a reference beam R and a signal beam S by the beam splitter 4. The reference beam R is reflected from the mirror 6 to the electro-optic phase modulator 8, and subsequently reflected by mirror 10 and prism 12 onto the hologram recording media 14. The signal beam S is expanded with the lens 16 and collimated by lens 18. The collimated signal beam S reflects off the test surface 20 through lens 18 and into prism 12. The prism 12 reflects the reference beam R and the signal beam S onto the hologram recording material 14. The hologram recording material 14 is preferably a self-developing material, such as a photochromic plastic or photographic material pretreated with a developer solution.

The interaction of the signal beam S and the reference beam R with the hologram recording material 14 gives rise to a reconstructed signal beam RS, which propagates along with the signal beam S. The lens 22 images the signal beam S and the reconstructed signal beam RS, at the image plane 24. Part of the superimposed beams (S+RS), is reflected by the beam splitter 26 onto the photodetector 28.

The electronic circuitry consists of a negative feedback system. The output 30 of the photodetector 28 is amplified and filtered by the band-pass amplifier 32. The phase of the band-pass amplifier output 34 is detected by the phase detector 36. The phase detector 36 compares the phase of the signal 34 to the phase of a 4.3 kilohertz signal 38 from the signal generator 40. The phase detector 36 has a low pass filter which removes the 4.3 kilohertz carrier and passes demodulated phase information. The output 42 of the phase detector 36 is a voltage which varies with the amplitude and phase of the 4.3 kilohertz component of signal 34. The signal 42 is added to an alternating 4.3 kilohertz signal 44 from the signal generator 40 by the direct coupled summing amplifier 46. The output 48 of the summing amplifier 46 is further amplified by the high-voltage direct-coupled amplifier 50 and the resulting signal 52 is applied to the electro-optic phase modulator 8.

The electro-optic phase modulator 8 adjusts the phase of the reference beam R to compensate for environmentally induced phase perturbation of both beams R and S. The amount of allowable change in phase between the reference and signal beams can be controlled by the loop gain of the feedback system.

Figure 2:
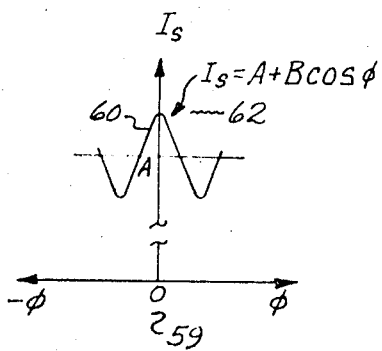
FIG. 2 is a plot of the intensity and phase relationship when phase modulation is about the point of zero-phase difference.
Figure 3:
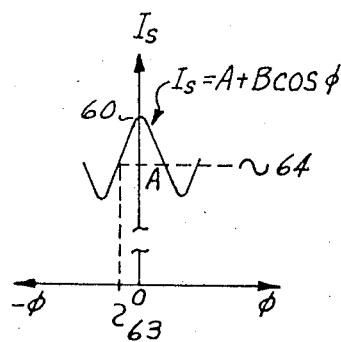
FIG. 3 is a plot of the relationship between intensity and phase difference when the phase modulation is about the positive slope of the intensity curve.
Figure 4:
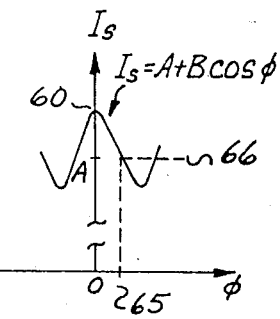
FIG. 4 is a plot of the relationship between intensity and phase difference when the phase modulation is about the negative slope of the intensity curve.

FIGS. 2 through 4 present graphic plots of the equation previously derived describing the relationship between the intensity $I_s$, and the phase difference between the direct and reconstructed wave front during interferometric use of a stored-beam hologram.

If a change in intensity occurs due to phase perturbation in either the direct or reconstructed wave fronts, the intensity can be maintained at some desired reference level by changing the phase of either wave front. When recording a stored-beam hologram, the intensity is changing as a function of time, thus the coefficients A and B of the general equation previously derived are increasing. However, for small time intervals, the intensity curves are adequately represented by the plots of FIGS. 2 through 4.

Although the FIG. 1 embodiment utilizes AC feedback control for stabilization, it should be noted that DC stabilization could have been used for the reconstruction stage. In DC stabilization, a reference voltage corresponding to a chosen point on the intensity curve is compared to the output of the photodetector. Any difference in voltage represents an error in phase angle between the direct and reconstructed wave fronts. To minimize this error, a standard closed-loop negative feedback system can be used. The error voltage should be filtered, amplified, and applied to an electro-optic phase modulator.

For AC stabilization, which is the stabilization used in the FIG. 1 embodiment and is applicable to both recording and reconstructing of the hologram, the phase of the optical reference beam is modulated by a sinusoidal voltage at the optical phase modulator. The frequency of 4.3 kHz. is used for convenience. The only requirement placed on the modulating frequency is that it be a frequency which is not within the range of frequencies which the stabilization system has to compensate for.

A sinusoidal waveform was used for convenience. Other waveforms may be used. Modulation depth was approximately $\pi/9$ radians. The effect of phase modulation on the voltage output of the photodetector is shown in FIGS. 2 through 4.

Referring now to FIG. 2, the phase modulation 59 is about the point of zero-phase difference. Since the slope of the response characteristic 60 is zero, the detector output 62 contains only higher order harmonics of the modulating frequency. The fundamental component will be zero.

In FIG. 3, phase modulation 63 is about the positive slope of the response characteristic 60 and the output 64 approximates a sine wave with the output amplitude and phase relationship as shown. In FIG. 4, the phase modulation 65 is about the negative slope of the response characteristic 60. Note the difference in phase angle between the detector outputs 64 and 66 for phase modulation of the positive and negative slopes of the response characteristic.

Comparison of the signal from the detector with the reference modulation applied to the electro-optic phase modulator determines the phase relationship between the direct and reconstructed wave fronts. Comparison of these two signals in a phase detector which is also amplitude sensitive, results in an error signal which can be used in a closed-loop negative feedback system to maintain a small error in optical phase angle. Other feedback techniques can be used to make this error approach zero.

The negative-feedback system utilized in the FIG. 1 embodiment will maintain adequate error margin thereby normally precluding a requirement for a more sophisticated feedback system. The system can be locked to either the crest or the valley of the intensity curve by changing the phase of the reference modulation by $\pi$ radians.

It will be readily understood by those skilled in this art that the higher order harmonic components present at the detector output could also be used for stabilization purposes. If an even harmonic is used, the detector output will be maximum when the phase error is zero.

The lock-in range is limited by the dynamic range of the system. The optical phase modulator usually limits the dynamic range constraining control to a limited number of wavelengths or to fractions of a wavelength. For a system with a dynamic range of several wavelengths, the error in phase remains small within the dynamic range. If the dynamic range is exceeded, the system maintains a small error for an equivalent wavelength change of one wavelength and approaches an error of a one-fourth wavelength for the next one-fourth wavelength of equivalent wavelength change.

The AC technique of wave front stabilization disclosed in FIG. 1 has advantages over the DC technique, since it is applicable to both reconstruction and recording of the stored-beam hologram. The DC technique, however, is susceptible to error due to the changing intensity at the detector during recording, whereas the AC system will maintain stability as the recording process takes place. As has been pointed out in the preceding theoretical discussion, it should be noted that a wide class of periodic and aperiodic phase perturbations can be used to effect stabilization in accordance with the teachings of this disclosure.

Figure 5:
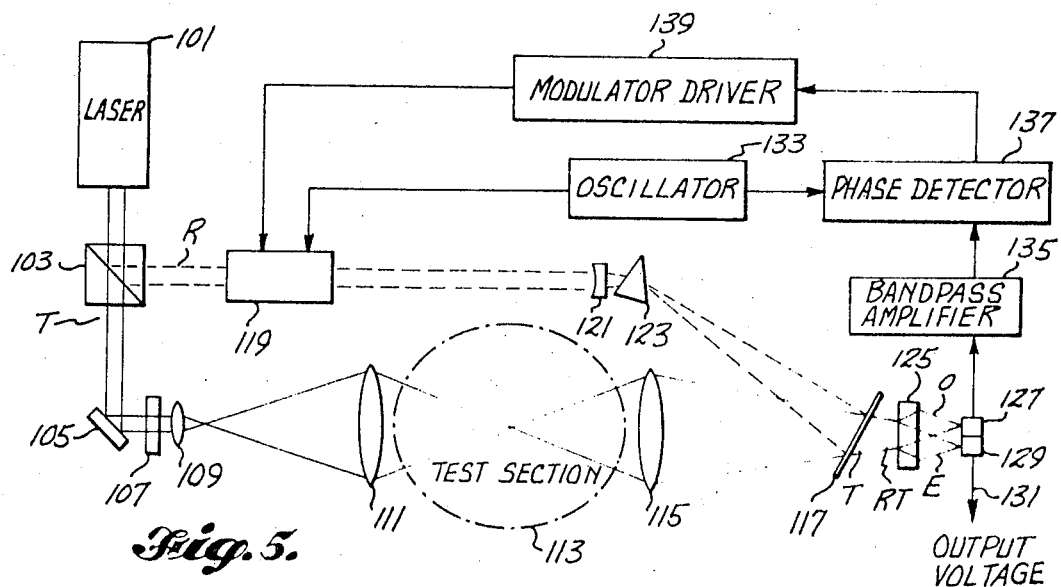
FIG. 5 relates to a special embodiment of the invention which is designed to sample local density fluctuation in a flowing gas.
Figure 6:
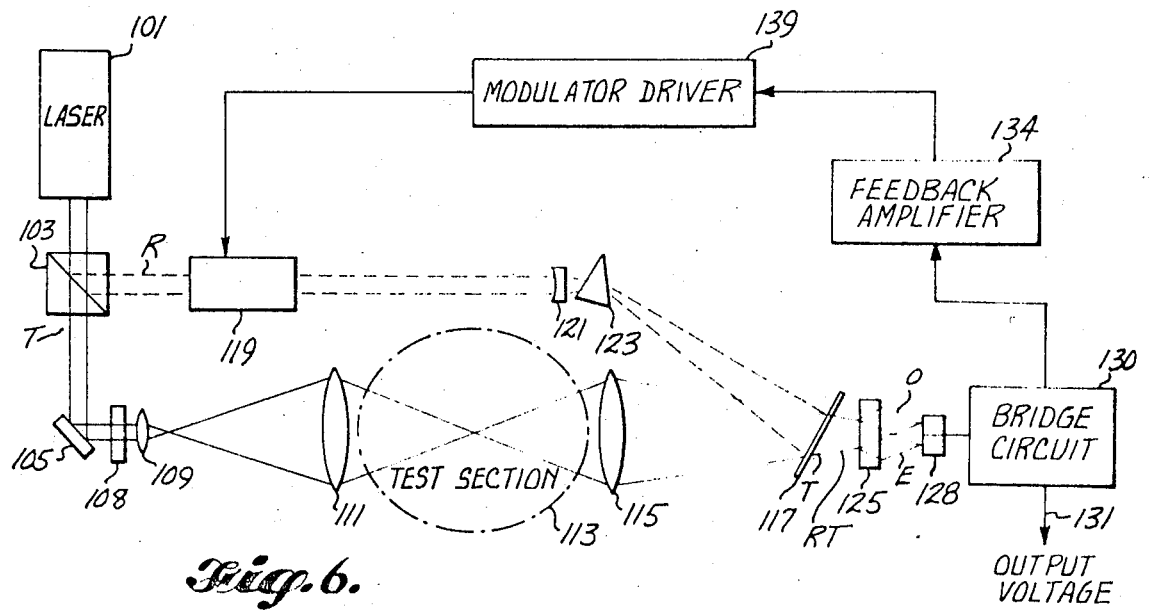
FIG. 6 is a schematic of an optical embodiment similar to that shown in FIG. 5 wherein the AC stabilization has been replaced by a DC stabilization feedback loop.

FIGS. 5 and 6 relate to another embodiment of this invention wherein the hologram stabilization apparatus is used to stabilize the fringes of a holographic interferometer, thereby eliminating the effects of environmental perturbations, and in addition, locking the output detector onto the linear portion of the response characteristic.

FIG. 5 is a schematic of the optical and electronic elements used with AC stabilization.

FIG. 6 is a schematic of the optical and electronic elements employing DC stabilization.

The particular variation of holographic interferometer shown in FIGS. 5 and 6 is designed to sample local density fluctuations in a flowing gas. As will be recognized by those skilled in the art, the use of a hologram in place of the final interferometer beam splitter eliminates the effect of aberrations inherent in this very fast (low $f$-number) optical system. This focused beam interferometer is preferentially sensitive to small-scale density fluctuations at focus—since, in this region, the optical phase is altered across the entire signal beam cross section. A small-scale density fluctuation outside the focal region affects only a portion of the beam cross section, resulting in a proportionate reduction in the change in optical phase.

Referring now to FIG. 5, the laser 101 emits a beam of coherent, plane polarized light. This beam is divided by beam splitter 103 into the test beam T and reference beam R. Test beam T reflects off mirror 105 and passes through quarter-wave retardation plate 107. Retardation plate 107 changes the polarization of the test beam from linear to circular polarization. Test beam T is then expanded by lens 109 to fill the aperture of lens 111. Lens 111 focuses test beam T within the test section 113. The test beam T is collected by lens 115 and impinges on the hologram 117. The hologram 117 is recorded and processed prior to operation of the test section. Retardation plate 107 is ordinarily removed while recording the hologram 117.

Reference beam R, after passing through phase modulator 119, expanding lens 121 and prism 123, also impinges on the hologram 117. Part of the reference beam R is diffracted by the hologram 117 into a plane polarized reconstructed test beam RT. The reconstructed test beam RT and the transmitted portion of the test beam T are incident on the calcite prism 125.

The calcite prism 125 is oriented with its optical axis normal to the nominal beam direction and rotated 45° from the plane of polarization of the reconstructed test beam RT so as to exploit the well-known property of double refraction. In this manner the optical power in the reconstructed reference beam is divided equally into the ordinary beam O and extraordinary beam E. The test beam T is also divided equally into the ordinary beam O and extraordinary beam E. However, since the test beam is circularly polarized, the O and E components of the test beam are 90° out of phase. The doubly refracted beams O and E fall respectively on stabilization detector 127 and output detector 129. The feedback electronics 133-139 are adjusted to hold detector 127 at a minimum of response characteristic. Because of the 90° phase difference of the O and E components of the test beam, this automatically holds output detector 129 at the half power region or linear region of the response characteristic. Thus, the output voltage 131 is linearly related to small-scale density variation at the focal region of the test section.

The operation of the stabilization electronics 133–139 is similar to that used in FIGS. 1–4. The center frequency is determined by the oscillator 133. The oscillator voltage applied to the modulator 119 causes a phase modulation of the reference beam R. The phase modulation is detected with detector 127 and amplified by band-pass amplifier 135. The passband of amplifier 135 determines the high-frequency cutoff of the stabilization loop. The density fluctuations of interest in the test section 113 occur at frequencies above the amplifier 135 bandwidth.

Phase detector 137 generates an error signal depending on the phase difference of the output signals of oscillator 133 and amplifier 135. The low-frequency error signal is amplified by the modulator driver 139 and applied to the modulator 119.

The AC stabilization method is used primarily for investigating high frequency density fluctuations associated with acoustic noise generation. As mentioned before, the use of AC stabilization (as opposed to DC stabilization) eliminates problems caused by drift. However, the apparatus shown in FIG. 5 can be used with DC stabilization, as shown in FIG. 6. The DC stabilization offers certain advantages when investigating low frequency density fluctuations.

Referring now to FIG. 6, the quarter-wave retardation plate 107 of FIG. 5 is replaced by half-wave retardation plate 108. (Again, the hologram is recorded and processed with the retardation plate 108 removed.) The retardation plate 108 is adjusted to impart 90° rotation of the plane of polarization of the test beam T. The overall effect of this change in polarization of the test beam is that the intensities of beams O and E are now 180° apart on the response characteristic rather than 90° apart.

The beams O and E are detected with two detectors in detector assembly 128. The detector output is coupled into bridge circuit 130. The bridge circuit provides an error voltage depending on the difference in intensities of O and E. The error voltage is amplified by the feedback amplifier 134 and applied to modulator 119 by modulator driver 139. The modulator 119 responds to equalize the intensities O and E. The output voltage 131 is shown coupled out of the bridge circuit, although in practice the output may be coupled out at other points of the feedback loop, such as at the output of feedback amplifier 134. Depending on the method of output coupling, it is possible to substantially reduce the effects of laser amplitude variation.

What is claimed is:

1. In apparatus for development or viewing of a hologram which includes means for generating two direct beams of coherent light and for passing one of said beams through said hologram to thereby create a reconstructed wave front by the interaction of said one of said beams with said hologram, an improved closed-loop system for stabilizing the wave fronts at the plane of said hologram comprising: light-sensitive means, positioned in the path of light from said reconstructed wave front and said one of said beams, for sensing the combined light intensity of a portion of said reconstructed wave front and said one of said beams; means for producing an output signal proportional to said combined light intensity; means responsive to said output signal for adjusting the phase of one of said two direct beams to stabilize the wave fronts at the plane of said hologram, means for changing the relative state of polarization of said two direct beams and means for focusing one of said beams onto a position within a specimen to be examined; wherein said means for sensing includes means utilizing the property of double refraction to divide light into two portions.

2. Apparatus according to claim 1 wherein said means for changing the relative state of polarization includes means for changing the polarization of one of said two direct beams from linear to circular.

3. Apparatus according to claim 1 wherein said means for changing the relative state of polarization includes means for changing the planes of polarization so that said planes are approximately orthogonal.

4. An apparatus of the class described comprising means for generating two direct beams of coherent light, means for generating a reconstructed wave front by passing one of said direct beams through a hologram, and means for stabilizing the wave fronts at the recording plane of said hologram, said means for stabilizing comprising: means for generating a selected periodic signal; means responsive to the combined light intensity of said reconstructed wave front and said one of said direct beams to effect an output signal; means responsive to said output signal for producing a second output signal which has been filtered to a selected frequency bandwidth; means for detecting the phase and amplitude of said second output signal to effect a control signal; and means responsive to said control signal and said periodic signal for phase modulating one of said beams to reduce the relative phase difference between said reconstructed wave front and said one of said beams at said recording plane.

5. In apparatus of the class described which includes means for generating two direct beams of coherent light, a holographic medium positioned for development or viewing of a hologram, means for passing one of said beams through said hologram to create a reconstructed wave front through the interaction of said one of said beams with said hologram, an improved closed loop system for stabilizing the wave fronts at the recording plane of said hologram comprising: light-sensitive means positioned for sensing the combined light intensity of a portion of said reconstructed wave front and said one of said beams; band-pass filtering means, operably connected to said light-sensitive means, for producing an electrical output signal proportional to said light intensity and filtered to a selected frequency range; signal generator means for generating an electrical periodic signal; optical phase modulator means, responsive to said periodic signal, for modulating the phase of one of said beams; electrical signal phase detector means for comparing the phase and amplitude of said output signal and said periodic signal and for generating an error signal proportional to the phase difference between said output and said periodic signal; and means responsive to said error signal for adjusting the phase of one of the said beams to stabilize the wave fronts at the plane of said hologram.

* * * * *